Sept. 1, 1953  E. R. ALLER ET AL  2,650,726
HOPPER CAR FOR STORAGE AND TRANSPORTATION
OF FINELY DIVIDED MATERIALS
Filed Aug. 22, 1950  2 Sheets-Sheet 1
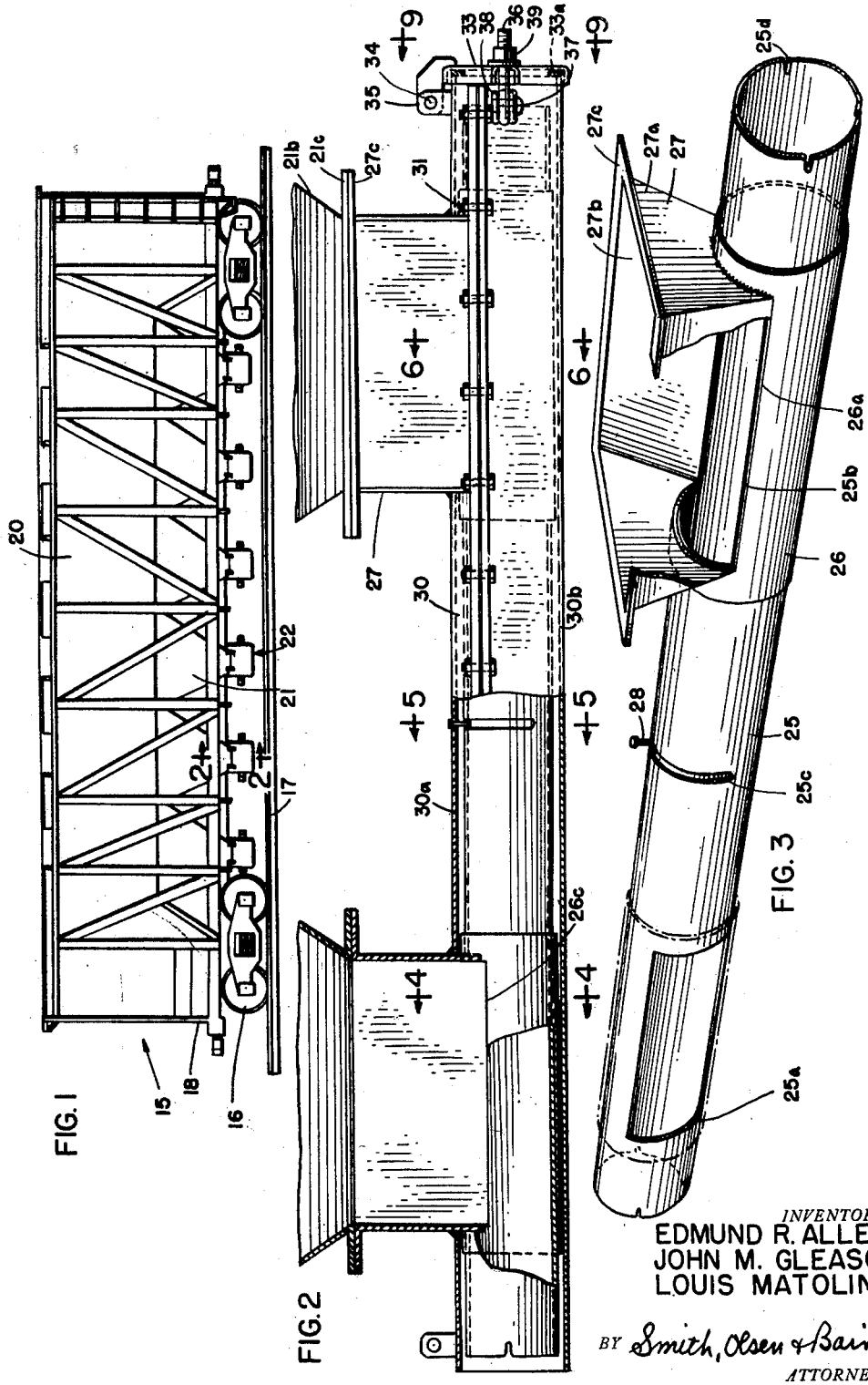
INVENTORS:
EDMUND R. ALLER
JOHN M. GLEASON
LOUIS MATOLIN
BY Smith, Olsen & Baird
ATTORNEY'S

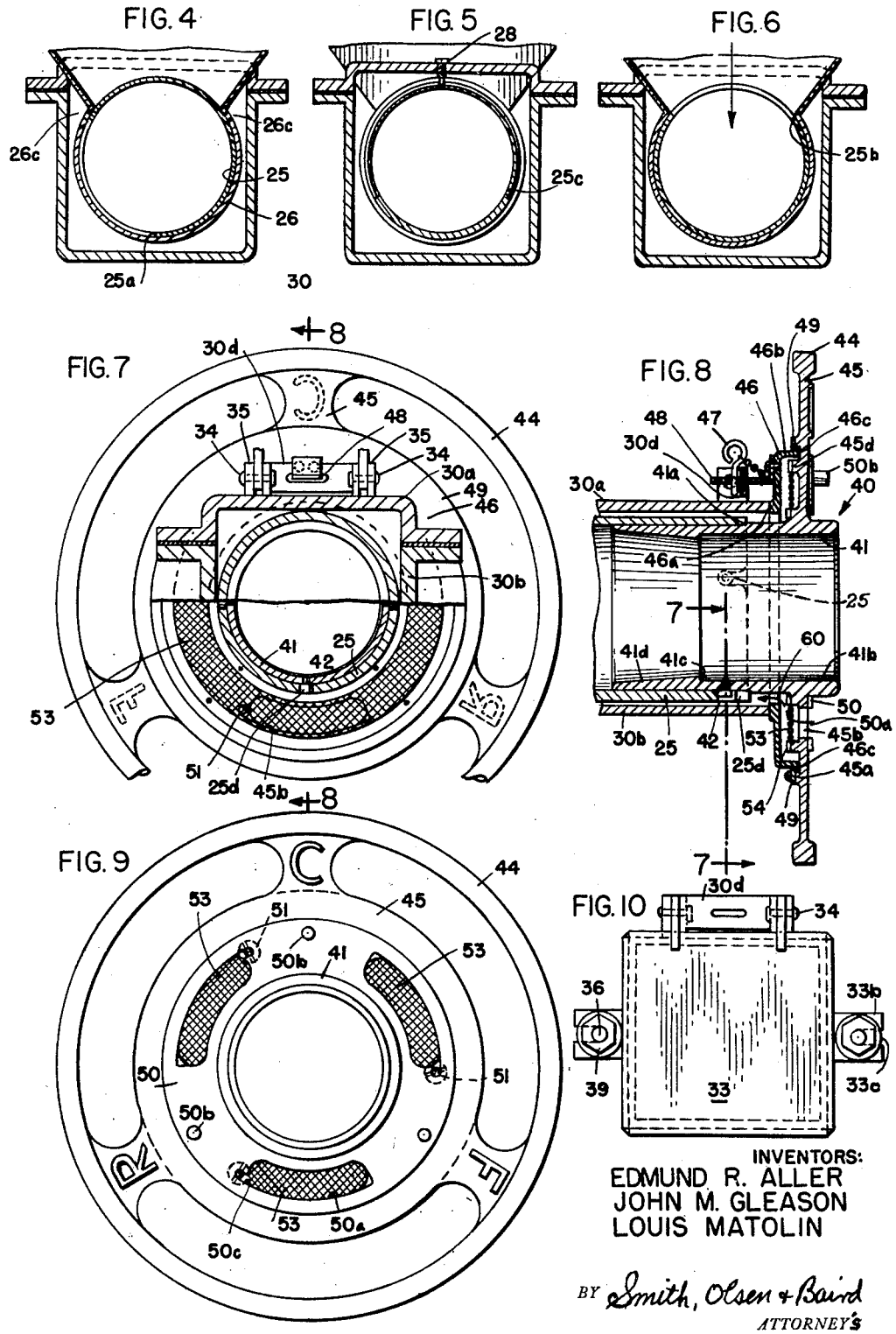

Patented Sept. 1, 1953

2,650,726

UNITED STATES PATENT OFFICE 2,650,726

HOPPER CAR FOR STORAGE AND TRANSPORTATION OF FINELY DIVIDED MATERIALS

Edmund R. Aller, Ogden Dunes, Ind., John M. Gleason, La Grange Park, Ill., and Louis Matolin, East Chicago, Ind., assignors to General American Transportation Corporation, Chicago, Ill., a corporation of New York Application August 22, 1950, Serial No. 180,882

22 Claims. (Cl. 214—83.28)

This invention relates to improvements in hoppers for storing finely divided or granular materials, which may be of more or less cohesive nature, such as flour, certain chemicals, and the like, and more particularly, to hopper cars for storing and transporting such materials. The primary purpose of the invention is to provide new and efficient means for discharging the materials from the hoppers.

The transportation in bulk of finely divided and granular materials, such as those mentioned, is desirable because of the great saving in space and expense as compared with the former practice of shipping in sacks and other individual containers and because of the reduced liability of contamination of the materials. The bulk storage and shipment of such materials has presented several problems, however, among which is that of quickly and conveniently unloading the materials from the storage chambers without danger of contamination.

The principal object of the present invention, therefore, is to provide improved means for unloading the contents of a hopper car by suction. A further object is to provide a simple unitary discharge means by which a plurality of hoppers may be selectively emptied through a common discharge channel. Still another object is to provide a rotatable suction tube having a plurality of inlet ports adapted, upon rotation of the tube, to be caused to communicate selectively with the discharge openings of a plurality of hoppers. A further object is to provide discharge means for a hopper car having improved means for causing a discharge tube to communicate with any one of a plurality of hoppers, for establishing a suction connection with the tube, and for admitting atmospheric air at the proper points to assist the action of suction. Other objects relate to various features of construction and arrangement which will appear more fully hereinafter.

The nature of the invention will be understood from the following specification taken with the accompanying drawings in which one embodiment is illustrated. In the drawings, Figure 1 shows a side elevation of an improved hopper car embodying the features of the present invention;

Fig. 2 shows an enlarged transverse section taken on the line 2—2 of Fig. 1;

Fig. 3 is a perspective view of the rotatable suction discharge tube with one of the bearing tubes in which it is mounted;

Fig. 4 shows a sectional view taken on the line 4—4 of Fig. 2;

Fig. 5 shows a sectional view taken on the line 5—5 of Fig. 2;

Fig. 6 shows a sectional view taken on the line 6—6 of Fig. 2;

Fig. 7 shows a partial end elevation and partial section of the controlling device by which the discharge of finely divided materials through the suction tube is controlled, the section being taken on the line 7—7 of Fig. 8;

Fig. 8 is a sectional view taken on the line 8—8 of Fig. 7;

Fig. 9 is an end elevation of the controlling device shown in Figs. 7 and 8; and Fig. 10 shows an end elevation of one of the discharge housings illustrating the removable door.

As illustrated in the drawings, the invention is embodied in a hopper car 15 comprising the usual wheeled truck 16 adapted to travel upon the tracks 17. The car comprises a frame structure 18 within which there is mounted a storage bin 20 adapted to contain flour, chemicals or other finely divided materials to be shipped and transported. This storage bin comprises a plurality of depending funnel-shaped hoppers 21 through which the materials are adapted to be discharged and these hoppers may form the bottoms of individual storage chambers or may have communication with a common storage chamber which extends throughout the area of the storage bin 20. In the embodiment illustrated, the depending hoppers 21 are arranged in two rows extending longitudinally of the car and the hoppers in the two rows are located opposite each other in pairs in a direction transversely of the car. The two hoppers of each pair are adapted to discharge their contents through discharging devices 22 which extend transversely of the car beneath its underframe and which are capable of use for discharging the contents of the storage bin or storage chambers at either side of the car.

Each of the unloading devices 22 comprises a rotary discharge tube 25 which is mounted in two bearing sleeves 26 and which is adapted to have communication with the bottoms of the hoppers 21 through connecting funnels 27 attached to the bearing sleeves 26. Each bearing sleeve 26 is provided in its top side with a longitudinal slot 26a which extends throughout substantially one-third of the circumference of the sleeve and at the ends of this slot each bearing sleeve is welded to the end walls 27a of one of the funnels 27. The sloping side walls 27b of the funnels have their lower edges welded to the bearing sleeves 26 along the margins of the slots 26a and the upper edges of the walls of the funnels 27 are provided with outwardly directed flanges 27c which are bolted to similar flanges 21c formed at the lower edges of the downwardly sloping walls 21b of the hoppers 21. The inclined walls 27b of the connecting funnels 27 have the same slope as the corresponding walls 21b of the hoppers so that the flour or other material is adapted to pass readily by gravity from the interior chamber of the hopper to the opening 26a in the associated bearing sleeve.

In order to permit the discharge of the flour or other finely divided material into the suction tube 25, this tube is provided with two longitudinally extending arcuate slots 25a and 25b which may be of substantially the same dimensions as, or slightly smaller than, the corresponding slots 26a which are formed in the bearing sleeves. The slots 25a and 25b extend through angles of substantially 120° so that they conform in width to the slots 26a and one slot 25a is offset angularly with respect to the other slot 25b so that, upon rotation of the tube 25, either slot 25a or 25b may be caused to communicate with the slot 26a of its bearing sleeve while, at the same time, the slot 26a in the other bearing sleeve is closed by the wall of the suction tube 25. In this way, either hopper 21 in a transverse row may be caused to discharge through the common suction tube 25 while the discharge from the other hopper in the same row is closed. The bearing sleeves 26 are preferably slightly longer than the discharge funnels 27 and, although they might be one continuous member, they are preferably formed as two members in order to decrease the weight and expense of the construction.

For the purpose of limiting the angular rotation of the suction discharge tube 25, this tube is provided between the discharge funnels 27 with a narrow arcuate groove 25c which is adapted to be engaged by the lower end of a stop screw 28 which is mounted in the top wall of the top section 30a of a discharge housing 30 which is of rectangular cross section and which encloses the suction tube 25 as well as the bearing sleeves 26. The upper section 30a of this housing is provided with transversely extending flanges which are engaged by corresponding flanges formed on the lower section 30b and these flanges are secured together by bolts 31. In assembling this structure, the discharge funnels 27 may be welded to the bearing sleeves 26 and to the top section 30a of the discharge housing 30, with the discharge tube 25 in place in the bearing sleeves; and thereafter the bottom section 30b of the discharge housing may be bolted to the upper section 30a and the flanges 27c of the discharge funnels may be bolted to the flanges 21c of the hoppers. The ends of each discharge housing 30 are adapted to be closed by doors 33 which are hinged at 34 on ears 35 which project upwardly from the ends of the upper sections 30a of the housings. The doors 33 are somewhat cup-shaped to enclose the ends of the housings 30 and, being of rectangular cross section, are provided with seal strips 33a which are adapted to engage the ends of the housing 30 to form a tight joint when these doors are closed. Each door 33 is provided on its opposite sides with projecting flanges 33b provided with slots 33c which are adapted to be engaged by eye-bolts 36 pivoted at 37 on lugs 38 which are attached to the sides of the lower section 30b of the housing. A nut 39 engages the threaded end of each of the bolts and is adapted to occupy a position on the outer side of one of the flanges 33b when the bolt is swung to the operating position shown in Fig. 10. Then, upon tightening the nuts 39, the doors 33 are securely held in closed positions.

The suction discharge tube 25 has a substantially close fit within the bearing sleeves 26 and the materials passing into the tube through the discharge funnels 27 may be withdrawn from either end of the tube by means of a suction conduit adapted to be connected with either end of the tube by the means which are illustrated particularly in Figs. 7, 8 and 9. The connection with the suction conduit is formed by a connecting device 40 comprising a sleeve 41 having a telescoping fit with the outer end of the tube 25 to the point where the end of the tube engages a shoulder 41a formed on the sleeve 41. When in this position, three pins 42 secured in the sleeve 41 engage slots or recesses 25d which are formed in the inner wall of the tube at the ends thereof, thus holding the tube and the sleeve 41 against relative rotation. For the purpose of rotating the sleeve 41 and the tube 25 the sleeve is provided with a radially projecting hand wheel 44 which may be attached thereto or formed integrally therewith and by rotating this wheel, the suction tube 25 may be moved angularly to cause one or the other of the openings 25a or 25b to communicate with the associated opening 26a in a bearing sleeve or to move the tube 25 to a position where both of the discharge openings 26a are closed by the wall of the tube.

The suction conduit or hose which leads from a suitable suction pump or the like is provided at its end with a tubular fitting, not illustrated, which is adapted to have a telescoping engagement with the tubular bore 41b of the sleeve 41 and to be inserted therein to the extent permitted by the annular shoulder 41c. From the shoulder 41c inwardly, the wall 41d of the sleeve is preferably flared outwardly, as shown in Fig. 8, to facilitate the discharge of the finely divided materials.

The sleeve 41 is rotated manually by means of the rim of the wheel 44 which is formed on the outer margin of a disk 45 attached to or formed integrally with the sleeve 41 adjacent its outer end. This disk and the sleeve 41 revolve with respect to an annular member 46 which has a central square aperture of about the same area as the inner cross section of the housing 30. Around this aperture there is formed a flat sealing flange 46a which seats against the end face of the housing. The ring member 46 is held against displacement endwise of the housing by means of a pin 47 which engages an aperture in an inwardly extending plate 48 attached to the member 46 and extending through an aperture in a boss 30d formed in the upper part of the housing.

The member 46 has an outwardly turned annular flange 46b terminating in a radial lip 46c which seats against the disk 45 on the inner side of an annular boss 45a formed on the disk. A retaining ring 49 is secured to the boss 45a and overlaps the lip 46c to hold the members 45 and 46 in assembled relation while permitting rotation of the disk 45 and its connected sleeve 41.

The disk 45 is provided with a plurality of arcuate air inlet ports 45b which are concentric with the axis of rotation of the disk and which may be partially or wholly closed by an annular cover plate 50 arranged to seat against the outer face of the disk around the projecting end of the tubular fitting 41. The plate 50 is provided with a plurality of arcuate slots 50a which are the same in number as the slots 45b and of substantially the same size and shape. The plate 50 may be rotated around the tube 41 by a projecting handle 50b and it is retained in position on the disk by a plurality of screws 51 which engage threaded apertures in the disk and have heads overlapping the outer face of the cover plate. These screws engage extensions 50c of the slots 50a when these slots are fully open by the angular movement of the cover plate.

On its inner side the disk 45 is provided with spaced annular bosses 45d to which an annular wire screen 53 of relatively fine mesh is attached by means of retaining rings 54. When the cover plate is moved to a position to open the ports 45b, air enters through the ports 45b and the screen 53, through the space between the member 46 and the tube 41 and then through the space between the housing 30 and the rotary discharge tube 25 as indicated by the arrows 60, to the other end of the tube 25 where it enters behind the materials which are being withdrawn by suction through the connection 40 and the suction hose or conduit.

When handling very finely pulverized flour or the like it may be desirable to permit additional air to enter at the places where the flour passes from the hoppers into the discharge tube and this may be accomplished by providing long narrow slots 26c in the sides of the bearing sleeves 26 at the places where they are welded to the discharge funnels 27, as indicated in Figs. 3 and 4.

Assuming that the car 15 has reached its destination and is to be unloaded, the door 33 at the end of an unloading device 22 which is most convenient to the source of suction is opened after releasing the bolts 36, and the door at the other end remains closed. The connecting device 40 is then mounted on the open end of the housing 30 with the tube 41 entering the rotary discharge tube 25 until its shoulder 41a engages the end of the tube 25 with the pins 42 interlocking with the slots 25d. At the same time the annular member 46 is seated against the end of the housing 30 and is secured in place by inserting the pin 47 through the aperture in the plate 48. The suction line fitting is then inserted in the outer end of the tubular member 41. Then, after turning the cover plate 50 to open the ports 50a to the desired extent, the handwheel 44 is operated to turn the suction tube 25 until the desired port 25a or 25b in the suction tube is turned upwardly to communicate with its discharge funnel. The letters "F," "R" and "C," spaced 120° apart on the handwheel, indicate to the operator whether the front or the rear hopper is open to discharge or both discharge openings closed. After the parts have thus been assembled and adjusted, the suction is applied and the hopper contents are discharged. It has been found that the discharge is very rapid and effective and that the several hoppers may be quickly and completely emptied by applying the suction apparatus and the connecting devices successively to the several discharge units 22.

Although one form of the invention has been shown and described by way of illustration, it will be understood that it may be constructed in various different embodiments which come within the scope of the appended claims.

We claim:

1. In combination, a plurality of hoppers for the storage of finely divided material and having discharge openings, said hoppers being arranged in a row, a suction tube extending beneath said row of hoppers and mounted for rotation about its own longitudinal axis, said tube having angularly displaced inlet ports each adapted to be rotated into communication with the discharge opening of one of said hoppers, and means for withdrawing said material by suction from said tube.

2. In combination, a plurality of hoppers, for the storage of finely divided material and having discharge openings, said hoppers being arranged in a row, a suction tube extending beneath said row of hoppers and mounted for rotation about its own longitudinal axis, said tube having angularly displaced inlet ports each adapted to be rotated into communication with the discharge opening of one of said hoppers, and means for selectively withdrawing said material by suction from either end of said tube.

3. In combination, a plurality of hoppers for the storage of finely divided material and having discharge openings, said hoppers being arranged in a row, a suction tube extending beneath said row of hoppers and mounted for rotation about its own longitudinal axis, said tube having angularly displaced inlet ports each adapted to communicate with the discharge opening of one of said hoppers, means for selectively withdrawing said material by suction from either end of said tube, and means for conveying air to the end of the tube opposite that from which the material is withdrawn.

4. The combination in a car for the storage and transportation of finely divided material, of a plurality of material hoppers having discharge openings, said hoppers being arranged in rows extending transversely of the car, a rotary suction tube extending transversely of the car beneath each row of hoppers, said tube having angularly and axially displaced inlet ports each adapted to communicate with the discharge opening of one of said hoppers, and a suction discharge device adapted to be detachably mounted on either end of said tube.

5. In combination, a plurality of hoppers for the storage of finely divided material and having discharge openings at their bottoms, a plurality of bearing sleeves each mounted below one of said hoppers and having an inlet opening arranged to communicate with one of said discharge openings, and a rotary discharge tube journaled in said sleeves and having inlet ports each adapted to register with one of said inlet openings when said discharge tube is in a predetermined angular position.

6. In combination, a plurality of hoppers for the storage of finely divided material and having discharge openings at their bottoms, a plurality of bearing sleeves each mounted below one of said hoppers and having an inlet opening arranged to communicate with one of said discharge openings, and a rotary discharge tube journaled in said sleeves and having angularly offset inlet ports each adapted to communicate with one of said inlet openings upon rotary movement of said tube to a predetermined position.

7. In combination, a plurality of hoppers for the storage of finely divided material and having discharge openings at their bottoms, a plurality of bearing sleeves each mounted below one of said hoppers and having an inlet opening arranged to communicate with one of said discharge openings, and a rotary discharge tube journaled in said sleeves and having angularly offset inlet ports each adapted to communicate with one of said inlet openings upon rotary movement of said tube to a predetermined position, said discharge tube being constructed to close all of said inlet openings when in one angular position.

8. The combination in a car for the storage and transportation of finely divided material, of a plurality of material hoppers having discharge openings at their bottoms, a plurality of bearing sleeves each mounted below one of said hoppers and having an inlet opening arranged to communicate with one of said discharge openings, a rotary discharge tube journaled in said sleeves and having inlet ports each adapted to register with one of said inlet openings when said discharge tube is in a predetermined angular position, a suction discharge device having a detachable interlocking engagement with the end of said tube, and means for detachably connecting a suction conduit with said device.

9. In combination, a plurality of hoppers for the storage of finely divided material and having discharge openings at their bottoms, a plurality of bearing sleeves each mounted below one of said hoppers and having an inlet opening arranged to communicate with one of said discharge openings, a rotary discharge tube journaled in said sleeves and having angularly offset inlet ports each adapted to communicate with one of said inlet openings upon rotary movement of said tube to a predetermined position, said tube being constructed to close all of said inlet openings when in one position, and means on the end of said tube for effecting the rotation of said tube.

10. The combination with a plurality of material hoppers for the storage of finely divided materials having discharge openings at their bottoms, of a plurality of bearing sleeves each mounted below one of said hoppers and having an inlet opening arranged to communicate with one of said discharge openings, a rotary discharge tube journaled in said sleeves and having angularly offset inlet ports each adapted to communicate with one of said inlet openings upon rotary movement of said tube to a predetermined position, said tube being constructed to close all of said inlet openings when in one position, means on the end of said tube for effecting the rotation of said tube, and means associated with said last named means for indicating which inlet opening is open.

11. The combination with a plurality of material hoppers for the storage of finely divided materials having discharge openings at their bottoms, of a plurality of bearing sleeves each mounted below one of said hoppers and having an inlet opening arranged to communicate with one of said discharge openings, a rotary discharge tube journaled in said sleeves and having inlet ports each adapted to register with one of said inlet openings when said discharge tube is in a predetermined angular position, and a suction discharge fitting having a detachable interlocking engagement with the end of said tube and provided with a handwheel by which said tube may be rotated.

12. In combination, a plurality of hoppers for the storage of finely divided material and having discharge openings at their bottoms, a plurality of bearing sleeves each mounted below one of said hoppers and having an inlet opening arranged to communicate with one of said discharge openings, a rotary discharge tube journaled in said sleeves and having angularly offset inlet ports each adapted to communicate with one of said inlet openings upon rotary movement of said tube to a predetermined position, and means for limiting the rotation of the tube in either direction.

13. In combination, a plurality of hoppers for the storage of finely divided material and having discharge openings at their bottoms, a plurality of bearing sleeves each mounted below one of said hoppers and having an inlet opening arranged to communicate with one of said discharge openings, a rotary discharge tube journaled in said sleeves and having inlet ports each adapted to register with one of said inlet openings when said discharge tube is in a predetermined angular position, and a housing enclosing said tube and said sleeves.

14. In combination, a plurality of hoppers for the storage of finely divided material and having discharge openings at their bottoms, a plurality of bearing sleeves each mounted below one of said hoppers and having an inlet opening arranged to communicate with one of said discharge openings, a rotary discharge tube journaled in said sleeves and having inlet ports each adapted to register with one of said inlet openings when said discharge tube is in a predetermined angular position, a housing enclosing said tube and said sleeves, a removable cover for the end of said tube, and a suction discharge unit engageable with the end of said tube and the end of said housing when said cover is removed.

15. In combination, a plurality of hoppers for the storage of finely divided material and having discharge openings at their bottoms, a plurality of bearing sleeves each mounted below one of said hoppers and having an inlet opening arranged to communicate with one of said discharge openings, a rotary discharge tube journaled in said sleeves and having inlet ports each adapted to register with one of said inlet openings when said discharge tube is in a predetermined angular position, a housing enclosing said tube and said sleeves, a connecting member engaging the end of said housing, and a suction tube having a telescoping engagement with said discharge tube and mounted for rotation with respect to said connecting member.

16. In combination, a plurality of hoppers for the storage of finely divided material and having discharge openings at their bottoms, a plurality of bearing sleeves each mounted below one of said hoppers and having an inlet opening arranged to communicate with one of said discharge openings, a rotary discharge tube journaled in said sleeves and having inlet ports each adapted to register with one of said inlet openings when said discharge tube is in a predetermined angular position, a housing enclosing said tube and said sleeves, a suction tube having a telescoping engagement with the end of said discharge tube and provided with an outwardly extending disk provided with air inlet ports, and a connecting member forming a connection between the end of said housing and said disk outwardly of said ports.

17. In combination, a plurality of hoppers for the storage of finely divided material and having discharge openings at their bottoms, a plurality of bearing sleeves each mounted below one of said hoppers and having an inlet opening arranged to communicate with one of said discharge openings, a rotary discharge tube journaled in said sleeves and having inlet ports each adapted to register with one of said inlet openings when said discharge tube is in a predetermined angular position, a housing enclosing said tube and said sleeves, a suction tube having a telescoping engagement with the end of said discharge tube and provided with an outwardly extending disk provided with air inlet ports, a connecting member forming a connection between the end of said housing and said disk outwardly of said ports, and means for regulating the flow of air inwardly through said air inlet ports.

18. The combination with a plurality of material hoppers for finely divided materials having discharge openings at their bottoms, of a plurality of bearing sleeves each mounted below one of said hoppers and having an inlet opening arranged to communicate with one of said discharge openings, a rotary discharge tube journaled in said sleeves and having inlet ports each adapted to register with one of said inlet openings when said discharge tube is in a predetermined angular position, a housing enclosing said tube and said sleeves, a suction tube having a telescoping engagement with the end of said discharge tube and provided with an outwardly extending disk provided with air inlet ports, a connecting member forming a connection between the end of said housing and said disk outwardly of said ports, and a screen mounted over said air inlet ports.

19. In combination, a plurality of hoppers for the storage of finely divided material and having discharge openings, said hoppers being arranged in a row, a suction tube extending beneath said row of hoppers and mounted for relative movement with respect thereto, said tube having spaced-apart inlet ports each adapted to be moved into communication with the discharge opening of one of said hoppers, and means for withdrawing said material by suction from said tube.

20. In combination, a plurality of hoppers for the storage of finely divided material and having discharge openings, said hoppers being arranged in a row, a suction tube extending beneath said row of hoppers and mounted for relative rotation about its own longitudinal axis with respect thereto, means responsive to selective rotation of said tube for selectively placing said tube in communication with said discharge openings, and means for withdrawing said material by suction from said tube.

21. In combination, a plurality of hoppers for the storage of finely divided material and having discharge openings, said hoppers being arranged in a row, a suction tube extending beneath said row of hoppers and mounted for relative movement with respect thereto, said tube having spaced-apart inlet ports each adapted to be moved into communication with the discharge opening of one of said hoppers, means for withdrawing said material by suction from either end of said tube, and means for admitting air under atmospheric pressure to said tube at the end thereof opposite that to which said suction means is connected.

22. In combination, a plurality of hoppers for the storage of finely divided material and having discharge openings at their bottoms, a plurality of bearing sleeves each mounted below one of said hoppers and having an inlet opening arranged to communicate with one of said discharge openings, a rotary discharge tube journaled in said sleeves and having inlet ports each adapted to register with one of said inlet openings when said discharge tube is in a predetermined angular position, a housing enclosing said tube and said sleeves and spaced therefrom, means for forming a suction connection with the end of said tube to withdraw said material through said tube from the hopper which is connected thereto through one of said inlet openings, and means for admitting atmospheric air through said housing around said tube to a position in said tube on the side of said material therein which is opposite the place where said suction is applied.

EDMUND R. ALLER.
JOHN M. GLEASON.
LOUIS MATOLIN.

References Cited in the file of this patent

UNITED STATES PATENTS

| Number | Name | Date |
|---|---|---|
| 2,030,553 | Tiley | Feb. 11, 1936 |
| 2,089,347 | Dondlinger | Aug. 10, 1937 |
| 2,190,727 | McKenna | Feb. 20, 1940 |
| 2,378,553 | Hornbrook | June 19, 1945 |
| 2,471,280 | Norbom | May 24, 1949 |
| 2,523,229 | Norbom | Sept. 19, 1950 |

FOREIGN PATENTS

| Number | Country | Date |
|---|---|---|
| 463,953 | Germany | July 19, 1928 |